United States Patent
Qu et al.

(10) Patent No.: US 11,502,962 B2
(45) Date of Patent: Nov. 15, 2022

(54) METHOD, APPARATUS, AND SYSTEM FOR IMPLEMENTING DATA TRANSMISSION

(71) Applicant: HUAWEI TECHNOLOGIES CO., LTD., Guangdong (CN)

(72) Inventors: Xiaoyang Qu, Nanjing (CN); Zhigang Huang, Grenoble (FR); Guang Chen, Nanjing (CN); Jian Chen, Nanjing (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 17/211,077

(22) Filed: Mar. 24, 2021

(65) Prior Publication Data
US 2021/0211386 A1    Jul. 8, 2021

Related U.S. Application Data

(63) Continuation of application No. PCT/CN2019/105252, filed on Sep. 11, 2019.

(30) Foreign Application Priority Data

Sep. 25, 2018 (CN) .......................... 201811115534.3

(51) Int. Cl.
*H04L 47/283* (2022.01)
*H04W 76/15* (2018.01)
(Continued)

(52) U.S. Cl.
CPC ............ *H04L 47/283* (2013.01); *H04L 45/24* (2013.01); *H04L 47/32* (2013.01);
(Continued)

(58) Field of Classification Search
None
See application file for complete search history.

(56) References Cited

U.S. PATENT DOCUMENTS

| 6,751,746 B1* | 6/2004 | Jain ......................... H04L 45/24 |
| | | 714/4.12 |
| 2014/0126415 A1* | 5/2014 | Shigei ..................... H04L 45/22 |
| | | 370/389 |

(Continued)

FOREIGN PATENT DOCUMENTS

| CN | 104040932 A | 9/2014 |
| CN | 104426866 A | 3/2015 |

(Continued)

OTHER PUBLICATIONS

IEEE Std 802.1Q—2011, IEEE Standard for Local and metropolitan area networks—Media Access Control (MAC) Bridges and Virtual Bridge Local Area Networks, Approved May 16, 2011, total 1365 pages.

(Continued)

*Primary Examiner* — Anh Ngoc M Nguyen
(74) *Attorney, Agent, or Firm* — Womble Bond Dickinson (US) LLP

(57) ABSTRACT

Embodiments of this application disclose a method, an apparatus, and a system for implementing data transmission. The method includes: obtaining, by a sending device, a data packet in a target data flow; and sending the data packet through each of at least two physical links between the sending device and a receiving device, where the data packet sent through each of the at least two physical links includes a same sequence number. Because the data packet in the target data flow is sent through different physical links, not through only one physical link, when a transmission latency of the data packet is increased due to a bandwidth instability factor such as burst traffic or electromagnetic wave interference on any physical link, the receiving device can combine, into a target video flow, data packets that are sent through other physical links and that have a lower latency.

16 Claims, 7 Drawing Sheets

(51) Int. Cl.
*H04L 45/24* (2022.01)
*H04L 47/32* (2022.01)
*H04W 28/02* (2009.01)
*H04L 61/255* (2022.01)
*H04L 61/5069* (2022.01)

(52) U.S. Cl.
CPC ....... *H04W 28/0236* (2013.01); *H04W 76/15* (2018.02); *H04L 61/255* (2013.01); *H04L 61/5069* (2022.05)

(56) References Cited

U.S. PATENT DOCUMENTS

| | | | |
|---|---|---|---|
| 2014/0347981 A1 | 11/2014 | Rangne et al. | |
| 2015/0085863 A1 | 3/2015 | Wu et al. | |
| 2015/0195267 A1* | 7/2015 | Miyata | H04L 63/126 726/5 |
| 2015/0264360 A1* | 9/2015 | Mizoguchi | H04N 21/631 375/240.13 |
| 2018/0206174 A1 | 7/2018 | Zhou et al. | |
| 2018/0206190 A1 | 7/2018 | Cherian et al. | |

FOREIGN PATENT DOCUMENTS

| | | |
|---|---|---|
| CN | 106411560 A | 2/2017 |
| CN | 107370688 A | 11/2017 |
| CN | 207166527 U | 3/2018 |
| KR | 20180103717 A | 9/2018 |

OTHER PUBLICATIONS

IEEE Std 802.3—2018, IEEE Standard for Ethernet, LAN/MAN Standards Committee of the IEEE Computer Society, Approved Jun. 14, 2018, total 5600 pages.

IEEE Std 802.11—2012, IEEE Standard for Information technology—Telecommunications and information exchange between systems Local and metropolitan area networks—Specific requirements, Part 11: Wireless LAN Medium Access Control (MAC) and Physical Layer (PHY) Specifications, Approved Feb. 6, 2012, total 2793 pages.

* cited by examiner

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
| Version | PHY ID |    PT   |  Status  |           TYPE          |
+-+-+-+-+-+-+-+-+-+-+-+-+-+-+-+-+-+-+-+-+-+-+-+-+-+-+-+-+-+-+-+-+
|          Sequence num           |         Sub sequence num        |
+-+-+-+-+-+-+-+-+-+-+-+-+-+-+-+-+-+-+-+-+-+-+-+-+-+-+-+-+-+-+-+-+
|                         options(Flow ID)                         |
+-+-+-+-+-+-+-+-+-+-+-+-+-+-+-+-+-+-+-+-+-+-+-+-+-+-+-+-+-+-+-+-+
```

METHOD, APPARATUS, AND SYSTEM FOR IMPLEMENTING DATA TRANSMISSION

CROSS-REFERENCE TO RELATED APPLICATIONS

This application is a continuation of International Application No. PCT/CN2019/105252, filed on Sep. 11, 2019, which claims priority to Chinese Patent Application No. 201811115534.3, filed on Sep. 25, 2018. The disclosures of the aforementioned applications are hereby incorporated by reference in their entireties.

TECHNICAL FIELD

Embodiments of this application relate to the field of communications technologies, and in particular, to a method, an apparatus, and a system for implementing data transmission.

BACKGROUND

Currently, there are increasingly popular services such as online mobile games and virtual reality (VR) games that have a relatively high requirement for a latency. For such services, a transmission latency of a data packet has great impact on service experience of users. For example, for the online mobile game services, if a latency is less than 50 ms, truly smooth user experience is provided. But if the latency is greater than 100 ms, the experience significantly deteriorates. Therefore, this type of service is also referred to as a latency-sensitive service.

In the prior art, data is transmitted between different communications devices on a physical link. When a problem such as a bandwidth instability caused by burst traffic in a data flow between two communications devices or electromagnetic wave interference occurs, a transmission latency is always increased.

SUMMARY

Embodiments of this application provide a method, an apparatus, and a system for implementing data transmission, to reduce a latency of data transmission on a WLAN network.

According to a first aspect, a method for implementing data transmission is provided. The method includes: obtaining, by a sending device, a data packet in a target data flow; and sending the data packet through each of at least two physical links between the sending device and a receiving device, where the data packet sent through each of the at least two physical links includes a same sequence number.

In an embodiment, the data packet in the target data flow is sent through different physical links, not through only one physical link. Therefore, when a transmission latency of the data packet is increased due to a bandwidth instability factor such as burst traffic or electromagnetic wave interference on any physical link, the receiving device can combine, into a target video flow, data packets that are sent through other physical links and that have a lower latency, thereby effectively lowering a data transmission latency.

In an embodiment, the sequence number of the data packet is carried in an extended header of the data packet between a data link layer header and a network layer header.

According to this embodiment, because the sequence number is carried in the extended header between the data link layer header and the network layer header, this implementation is compatible with different network layer protocols at an upper layer and different data link layer protocols at a lower layer. Therefore, there is relatively high compatibility. In addition, existing processing logic at a data link layer and existing processing logic at a network layer in the sending device and the receiving device are not changed. The features are easy to be implemented.

According to a second aspect, a method for implementing data transmission is provided. The method includes: receiving, by a receiving device, data packets in a target data flow through each of at least two physical links between the receiving device and a sending device, where each data packet in the target data flow received through each of the at least two physical links carries a sequence number; and for a data packet that is sent by the sending device through each of the at least two physical links and that includes a same sequence number in the target data flow, combining, by the receiving device, into the target data flow, the data packet that is first received and that carries the sequence number.

In an embodiment, the data packet in the target data flow is sent through different physical links, not through only one physical link. Therefore, when a transmission latency of the data packet is increased due to a bandwidth instability factor such as burst traffic or electromagnetic wave interference on any physical link, the receiving device can combine, into a target video flow, data packets that are sent through other physical links and that have a lower latency, thereby effectively lowering a data transmission latency.

In an embodiment, for the data packet that is sent by the sending device through each of the at least two physical links and that includes the same sequence number in the target data flow, the receiving device discards the data packet that is received later and that carries the sequence number.

According to this implementation, the data packet that is received later is discarded, so that storage resources can be effectively saved.

In an embodiment, the sequence number of each data packet in the target data flow is carried in an extended header of the data packet between a data link layer header and a network layer header.

According to this implementation, because the sequence number is carried in the extended header between the data link layer header and the network layer header, this implementation is compatible with different network layer protocols at an upper layer and different data link layer protocols at a lower layer. Therefore, there is relatively high compatibility. In addition, existing processing logic at a data link layer and existing processing logic at a network layer in the sending device and the receiving device are not changed. The features are easy to be implemented.

According to a third aspect, a communications device is provided. The communications device includes an obtaining unit and a communications unit. The obtaining unit is configured to obtain a data packet in a target data flow. The communications unit is configured to send the data packet through each of at least two physical links between the communications device and a receiving device, where the data packet sent through each of the at least two physical links includes a same sequence number.

In an embodiment, the sequence number of the data packet is carried in an extended header of the data packet between a data link layer header and a network layer header.

According to a fourth aspect, a communications device is provided. The communications device includes a communications unit and a processing unit. The communications unit is configured to receive data packets in a target data flow through each of at least two physical links between the communications device and a sending device, where each data packet in the target data flow received through each of the at least two physical links carries a sequence number. The processing unit is configured to: for a data packet that is sent by the sending device through each of the at least two physical links and that includes a same sequence number in the target data flow, combine, into the target data flow, the data packet that is first received and that carries the sequence number.

In an embodiment, the sequence number of each data packet in the target data flow is carried in an extended header of the data packet between a data link layer header and a network layer header.

According to a fifth aspect, a computer-readable storage medium is provided. The computer-readable storage medium stores an instruction, and when the instruction is run on a computer, the computer is enabled to perform the methods according to the foregoing aspects.

According to a sixth aspect, a computer program product including an instruction is provided. When the computer program product runs on a computer, the computer is enabled to perform the methods according to the foregoing aspects.

BRIEF DESCRIPTION OF DRAWINGS

To describe the technical solutions in the embodiments of this application more clearly, the following briefly describes the accompanying drawings required for the embodiments.

DESCRIPTION OF EMBODIMENTS

The following describes the embodiments of this application with reference to the accompanying drawings.

Figure 1A:
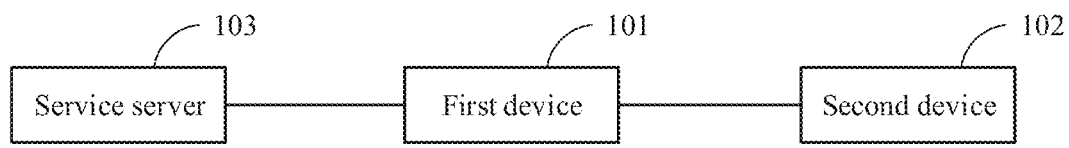
FIG. 1A to FIG. 1C are schematic diagrams of a networking structure of a communications system 100 according to an embodiment of this application.
Figure 1B:
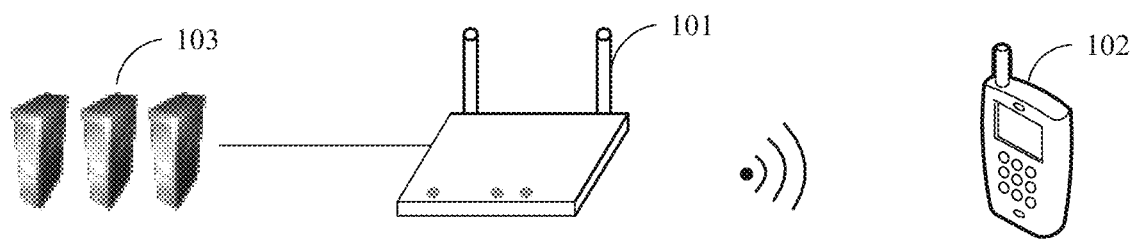
Figure 1C:
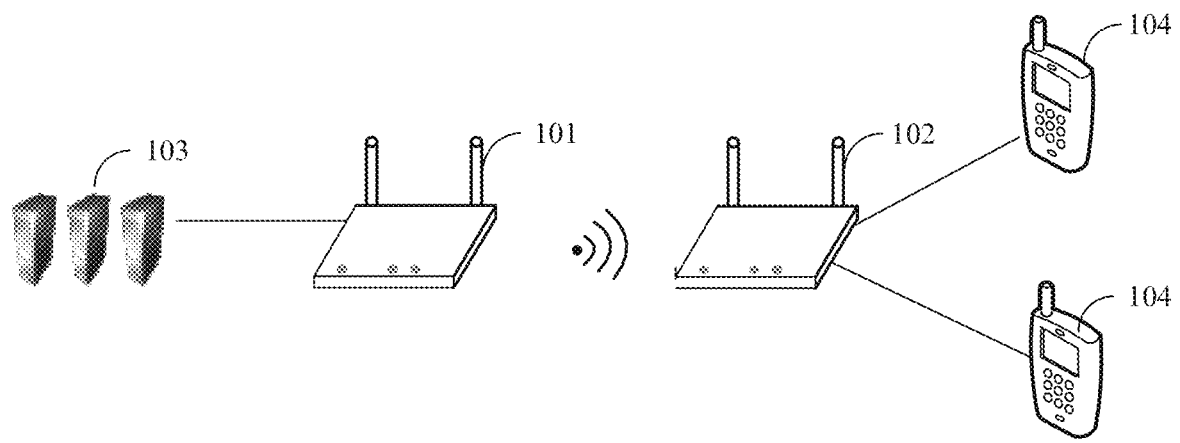

FIG. 1A to FIG. 1C are schematic diagrams of a networking structure of a communications system 100 according to an embodiment of this application. The communications system 100 includes a first device 101 and a second device 102. The first device 101 and the second device 102 may perform wired communication or wireless communication, for example, perform communication through wireless fidelity (Wi-Fi), or may perform both wired communication and wireless communication. The first device 101 may be a transmission device such as a router or a switch, and the second device 102 may be a transmission device such as a router or a switch, or may be a user terminal such as a set top box (STB) or a VR terminal. The communications system may further include a service server 103. The service server 103 may be an IPTV server, a VR video server, or the like.

For example, the first device and the second device communicate with each other through Wi-Fi. The first device 101 may be an AP device, and may be specifically a home AP device such as an optical network terminal (ONT) or customer premises equipment (CPE), or may be an enterprise network AP device.

As shown in FIG. 1B, the second device 102 may be a wireless user terminal, such as a wireless set top box (STB) or a wireless VR terminal. A wireless user terminal that performs communication through the Wi-Fi may also be referred to as a station (STA). In the communications system 100 shown in FIG. 1B, a data flow sent by the service server is sent to the second device 102 through the first device 101.

As shown in FIG. 1C, the second device 102 may be another AP device. The communications system 100 shown in FIG. 1C may further include a user terminal 104, such as an STB or a VR terminal. In the communications system 100 shown in FIG. 1C, a data flow sent by the service server is sent to the user terminal 104 through the first device 101 and the second device 102.

A plurality of network adapters may be deployed in each of the first device 101 and the second device 102. When the first device 101 and the second device 102 each are a wireless device, a plurality of wireless network adapters, for example, wireless network adapters operating in both of a 2.4G frequency band and a 5G frequency band, may be deployed in each of the first device 101 and the second device 102. The following describes a method 100 provided in Embodiment 1 of this application with reference to FIG. 2, FIG. 3, and FIG. 4A and FIG. 4B.

Figure 2:
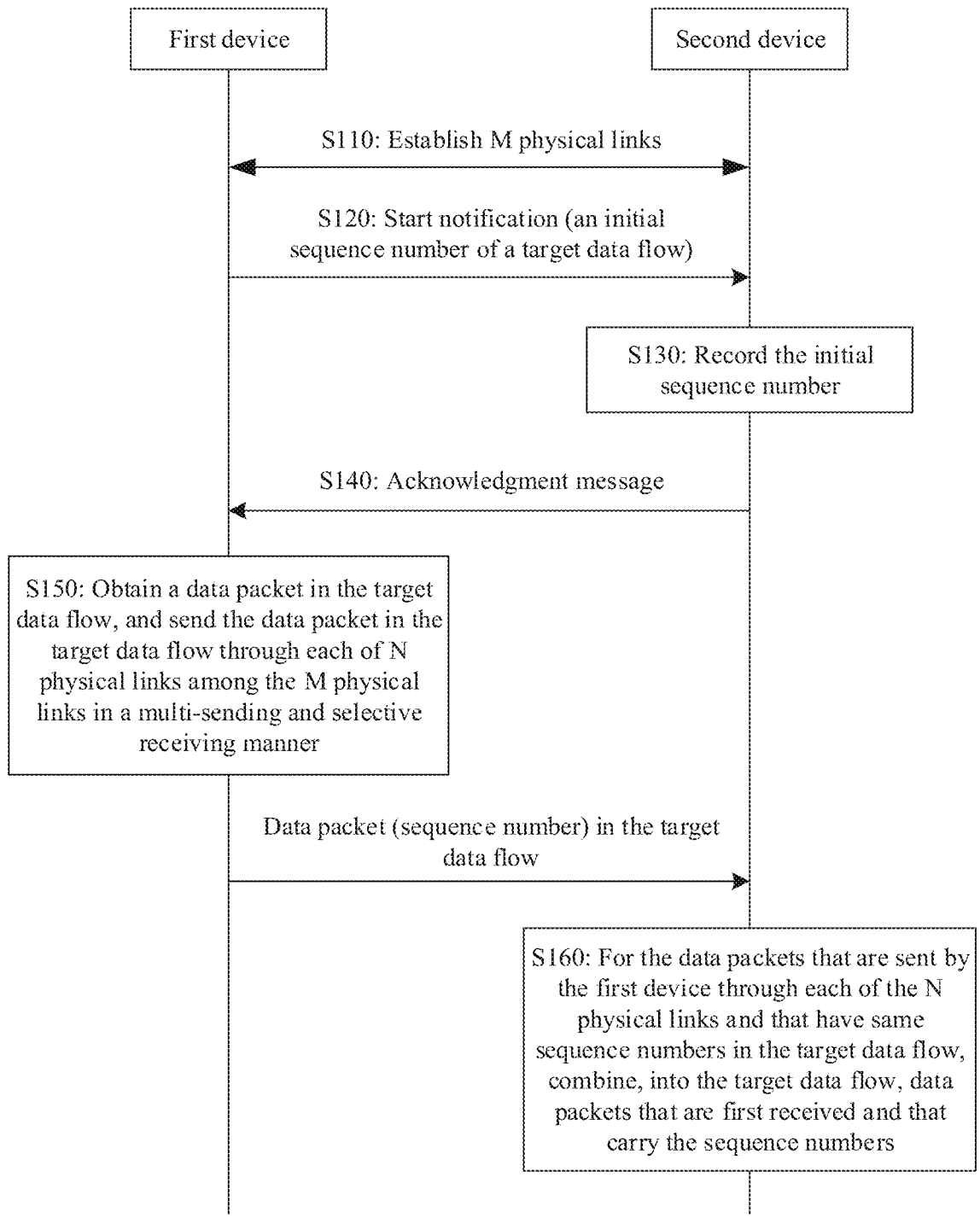
FIG. 2 and FIG. 3 are schematic flowcharts of a method 100 according to an embodiment of this application.

FIG. 2 is a schematic flowchart of the method according to Embodiment 1 of this application. The method in Embodiment 1 of this application may be applied to the communications system 100 shown in FIG. 1A to FIG. 1C.

As shown in FIG. 2, the method 100 includes the following operations.

Operation S110: Establish M physical links between a first device (the first device 101 shown in FIG. 1A to FIG. 1C) and a second device (the second device 102 shown in FIG. 1A to FIG. 1C), where M is a natural number not less than 2.

M network adapters may be deployed in each of the first device and the second device, and a physical link is established between corresponding network adapters of the first device and the second device.

When the first device and the second device communicate with each other through an ethernet, the established physical link is an ethernet link. When the first device and the second device communicate with each other through Wi-Fi, the established physical link is a WLAN link.

Operation S120: The first device sends a start notification to the second device.

The first device may send the start notification when starting to receive data packets in a target data flow. The start notification is used to notify the second device that the target data flow is to be sent to the second device on N physical links in a multi-sending and selective receiving manner, where N is a natural number greater than 1 and not greater than M. It may be understood that when N is equal to M, the physical links used to send the target data flow in the multi-sending and selective receiving manner are all the physical links established between the first device and the second device. For example, two WLAN links are established between the first device and the second device, may be a 5G link and a 2.4G link respectively, and the target data flow is to be sent through the two WLAN links. When N is less than M, the physical links used to send the target data flow in the multi-sending and selective receiving manner are some physical links established between the first device and the second device. For example, three physical links are established between the first device and the second device, and the target data flow may be sent through the three physical links in the multi-sending and selective receiving manner, or the target data flow may be sent through two of the three physical links in the multi-sending and selective receiving manner.

The start notification may include an initial sequence number of the target data flow, and may further include link identifiers of the N physical links. The initial sequence number of the target data flow is a sequence number of the first data packet that belongs to the target data flow and that is sent in the multi-sending and selective receiving manner in operation S150. The start notification may further include a data transmission manner, where the data transmission manner indicates that the first device is to send data packets in the target data flow to the second device in the multi-sending and selective receiving manner. The start notification may further include a flow identifier of the target data flow, and the flow identifier is used by the second device to determine whether to combine data packets that are received through different physical links and that carry the flow identifier.

In addition, when determining not to send the target data flow in the multi-sending and selective receiving manner, the first device may further send an end notification to the second device.

In this embodiment of this application, the first device sends the target data flow to the second device. Therefore, the first device may be referred to as a sending device, and the second device may be referred to as a receiving device.

In this embodiment of this application, "multi-sending and selective receiving" means that the sending device sends a same data packet through different physical links between the sending device and the receiving device, and for a received data packet that includes a same sequence number, the receiving device combines, into the data flow, the data packet that is first received and that carries the sequence number. The data packet in this embodiment of this application may be an internet protocol (Internet Protocol, IP) data packet.

Operations S130 and S140: After receiving the start notification, the second device determines, based on the start notification, that the first device is to send the target data flow through the N physical links in the multi-sending and selective receiving manner, records information, such as the initial sequence number, carried in the start notification, and returns an acknowledgment message.

Operation S150: The first device obtains data packets in the target data flow, and sends the data packets through each of the N physical links between the first device and the second device, where the data packets sent through different physical links have same sequence numbers.

Specifically, the first device sends the data packet through communications interfaces (for example, Wi-Fi interfaces) corresponding to different physical links.

The first device adds consecutive sequence numbers to the data packets in the target data flow sent in the multi-sending and selective receiving manner. The initial sequence number is added to the first data packet in the target data flow, and sequence numbers progressively increased by 1 are added to subsequent data packets in operation S150 sequentially. It may be understood that, if each data packet in the target data flow is sent in the multi-sending and selective receiving manner in operation S150, the sequence numbers of the data packets in the target data flow that are sent through any physical link in operation S150 are consecutive.

In operation S150, the first device may specifically replicate the data packet to obtain N−1 replicated data packets, send the data packet through one of the physical links, and send the N−1 replicated data packets through N−1 physical links.

During specific implementation, the first device may add the sequence numbers to the data packet and the replicated data packets of the data packet after replicating the data packet, or may add the sequence number to the data packet before replicating the data packet. In this case, the replicated data packets obtained after the data packet is replicated naturally carry the sequence number.

The first device specifically obtains the data packets in the target data flow from data packets to be sent to the second device. Specifically, the first device may identify the to-be-sent data packets, and identify data packets that meet a preset condition of the target data flow as the data packets in the target data flow. During specific implementation, the first device may send data packets of a plurality of services to the second device, and may transmit data packets of only some services in the multi-sending and selective receiving manner. For example, data flows of services that have a relatively high requirement for a latency, such as online mobile games or VR games, are transmitted in the multi-sending and selective receiving manner. Correspondingly, the first device may identify the data packets that are sent to the second device and that meet the preset condition as the data packets in the target data flow, and transmit the data packets in the multi-sending and selective receiving manner. For example, data packets that belong to one or more preset services are identified as the data packets in the target data flow. For another example, data packets whose 5-tuples are preset 5-tuples are identified as the data packets in the target data flow.

In an embodiment, multi-sending and selective receiving may be performed on data flows that are sent by one or more service servers, as a whole. Specifically, data packets whose source IP addresses are included in a source IP address list may be identified as the data packets in the target data flow. That is, the data packets whose source IP addresses are included in the source IP address list are used as the target data flow as a whole. The source IP address list includes one or more IP addresses, such as an IP address of a service server that provides video services with various high bit rates. During specific implementation, the first device may compare the source IP address in the to-be-sent data packet with the IP address in the source IP address list, and if the source IP address in the to-be-sent data packet is the same as any IP address in the source IP address list, identify the to-be-sent data packet as the data packet in the target data flow. The first device may add one or more obtained IPTV multicast IP addresses to the source IP address list, or may obtain an IP address corresponding to a preset domain name (for example, a domain name of a VR server) from a domain name system (DNS) exchange message between a user terminal and a service server, and add the IP address into the source IP address list.

In another embodiment, multi-sending and selective receiving may be performed on a data flow sent by a specific service server. Specifically, to-be-sent data packets whose source IP addresses in the data packets are preset source IP addresses (for example, an IP address of a VR server) may be identified as the data packets in the target data flow. That is, the data packets whose source IP addresses are the preset source IP addresses are used as the target data flow as a whole. During specific implementation, the first device may compare the source IP address in the to-be-sent data packet with the preset source IP address, and if the source IP address in the to-be-sent data packet is the same as the preset source IP address, identify the to-be-sent data packet as the data packet in the target data flow. The first device may set an obtained IPTV multicast IP address as the preset source IP address, or may obtain an IP address corresponding to a preset domain name (for example, a domain name of a VR server) from a DNS exchange message between a user terminal and a service server, and set the IP address as the preset source IP address. During specific implementation, a plurality of source IP addresses may be preset, and data packets whose source IP addresses are different preset source IP addresses are used as different target data flows and are separately transmitted in the multi-sending and selective receiving manner. Correspondingly, operations S120 to S160 of the method 100 are performed for each data flow.

In another embodiment, multi-sending and selective receiving may be performed on data flows that are sent to one or more user terminals (for example, a VR terminal), as a whole. Specifically, data packets whose destination IP addresses are included in a destination IP address list may be identified as the data packets in the target data flow. That is, the data packets whose destination IP addresses are included in the destination IP address list are used as the target data flow as a whole. The destination IP address list includes one or more IP addresses, such as IP addresses of a plurality of VR terminals. Multi-sending and selective receiving may alternatively be performed on a data flow to be sent to a specific user terminal (for example, a VR terminal). Specifically, to-be-sent data packets whose destination IP addresses in the data packets are preset destination IP addresses (for example, an IP address of a VR terminal) may be identified as the data packets in the target data flow. That is, the data packets whose destination IP addresses are the preset destination IP addresses are used as the target data flow as a whole.

In another embodiment, multi-sending and selective receiving may be performed based on a single data flow. That is, multi-sending and selective receiving is performed on a data flow whose 5-tuple is a preset 5-tuple. Specifically, to-be-sent data packets whose 5-tuples in the data packets are the preset 5-tuples may be identified as the data packets in the target data flow. That is, the data packets whose 5-tuples are the preset 5-tuples are used as the target data flow as a whole. During specific implementation, the first device may compare the 5-tuple in the to-be-sent data packet with the preset 5-tuple, and if the 5-tuple in the to-be-sent data packet is the same as the preset 5-tuple, identify the to-be-sent data packet as the data packet in the target data flow. A plurality of 5-tuples may be preset, and data packets whose 5-tuples are different preset 5-tuples are used as different target data flows and are separately transmitted in the multi-sending and selective receiving manner. Correspondingly, operations S120 to S160 of the method 100 are performed for each data flow.

In another embodiment, multi-sending and selective receiving may be performed on video flows in a unified manner. Specifically, video data packets in the to-be-sent data packets may be identified as the data packets in the target data flow. That is, the video data packets are used as a target data flow as a whole. The video data packet carries information used to indicate a video data for encapsulation, and the video data packet may be identified from the to-be-sent data packet based on the information.

In addition, the first device may also transmit, in the multi-sending and selective receiving manner as a whole, all data packets to be sent to the second device. That is, all the data packets to be sent by the first device to the second device are used as the target data flow as a whole.

Before sending each data packet in the target data flow in the multi-sending and selective receiving manner, the first device may further add, to the data packet, the link identifier of the physical link used to transmit the data packet, the flow identifier of the target data flow, information used to indicate that the data packet is sent in the multi-sending and selective receiving manner, and the like. The link identifier carried in each data packet is used by the second device to identify a physical link from which the data packet is received. The flow identifier carried in each data packet is used by the second device to identify the data packet that carries the flow identifier as the data packet in the target data flow. The information that is carried in each data packet and that is used to indicate that the data packet is sent in the multi-sending and selective receiving manner is used by the second device to determine a sending manner of the data packet, so that after determining that the sending manner of the data packet is the multi-sending and selective receiving manner, the second device combines, into the target data flow, the data packets received through the N physical links.

Operation S160: The second device receives the data packets in the target data flow through the N physical links, and for the data packets that are sent by the sending device through each of the N physical links separately and that have same sequence numbers in the target data flow, the second device combines, into the target data flow, data packets that are first received and that carry the sequence numbers.

In operation S160, the second device may first identify the data packet that belongs to the target data flow. If the data packet in the target data flow carries the flow identifier of the target data flow, the second device may further first identify, from the received data packets based on the flow identifier, the data packet that belongs to the target data flow. If there is only one target data flow in a same time period, data packets in the target data flow may not carry the flow identifier. Correspondingly, the second device may identify a data packet that carries a sequence number as the data packet that belongs to the target data flow.

In the process of obtaining through combination the target data flow, for the data packets that are sent by the first device through each of the N physical links and that have same sequence numbers in the target data flow, the second device combines, into the target data flow, the data packets that are first received and that carry the sequence numbers, and discards data packets that are received later and that carries the sequence numbers, to save storage resources. For each data packet used to obtain through combination the target data flow, the second device forwards the data packet or receives the data packet in an operating system protocol stack of the second device. Specially, if the second device is not a user terminal, and needs to forward the target data flow to a downstream device (for example, a user terminal, or another device between the second device and the user terminal), the second device forwards the data packet. For example, the second device is an AP, and forwards the data packet to a user terminal connected to the second device. If the second device is a user terminal, the second device receives the data packet in the operating system protocol stack of the second device.

Figure 3:
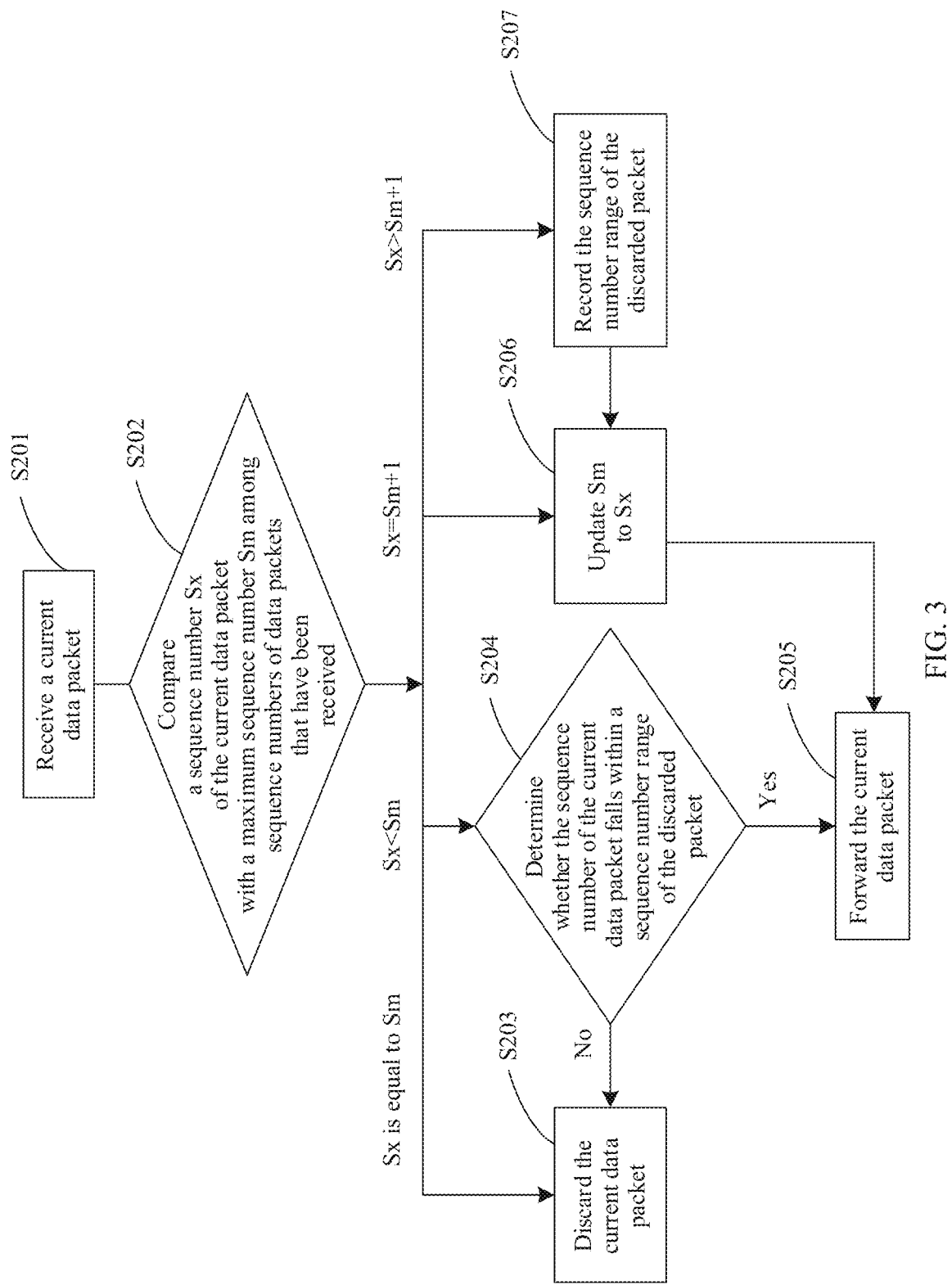

The following describes a specific implementation of operation S160 with reference to FIG. 3.

Subsequently, a data packet currently received by the second device is referred to as a current data packet, a sequence number of the current data packet is denoted as Sx, and a sequence number with a maximum value in the sequence numbers of data packets in the target data flow that have been received by the second device is denoted as Sm.

When the current data packet is the first data packet in the target data flow that is received in operation S160, Sx is used as a value of Sm. In addition, if Sx is equal to an initial sequence number Sc recorded in operation S130, the current data packet is directly forwarded or the current data packet is received in the operating system protocol stack. If Sx is greater than Sc, a data packet whose sequence number is less than Sx is discarded, and a sequence number range of the discarded packet is recorded, where the recorded sequence number range of the discarded packet may be included in a list of sequence numbers of discarded data packets, where for example, the list includes Sc, or may be an interval, such as [Sc, Sx).

When the current data packet is a subsequent data packet in the target data flow that is received in operation S160, the following operations are performed for processing.

Operation S201: The second device receives the current data packet.

Operation S202: The second device compares Sx with Sm.

If Sx is equal to Sm, the current data packet is a repeatedly received data packet, and the procedure goes to operation S203 to discard the current data packet.

If Sx is less than Sm, the procedure goes to operation S204 to further determine whether the current data packet falls within the sequence number range of the discarded packet.

If Sx is equal to Sm+1, it indicates that Sx is a next data packet of Sm in sequence. In this case, the procedure may go to operation S206 to update Sm to Sx, and then the procedure goes to operation S205 to forward the current data packet or receive the current data packet in the operating system protocol stack.

If Sx is greater than Sm+1, a data packet whose sequence number is between Sx and Sm+1 is discarded, and the procedure goes to operation S207 to record the sequence number range of the discarded packet.

Operation S203: Discard the current data packet.

Operation S204: Determine whether the current data packet falls within the sequence number range of the discarded packet.

If the sequence number range falls within the sequence number range of the discarded packet, the procedure goes to operation S205 to forward the current data packet, and update the sequence number range of the discarded packet, where Sx is not included within the updated sequence number range of the discarded packet. Otherwise, the current data packet is a repeatedly received data packet, and the procedure goes to operation S203 to discard the current data packet.

Operation S205: Forward the current data packet or receive the current data packet in the operating system protocol stack.

Operation S206: Update Sm to Sx.

Operation S207: Record the sequence number range of the discarded packet and go to operation S206. The recorded sequence number range of the discarded packet may be included in the list of sequence numbers of discarded packets, where for example, the list includes Sm+2, or may be a sequence number interval [Sm+1, Sx).

After operation S203 or operation S205 is performed, the received next data packet is used as a new current data packet, and operations S201 to S207 are performed again.

According to an embodiment of this application, information such as a master sequence number, a sub sequence number, and a flow identifier of the target data flow of the data packet may be carried in an extended header between a layer 2 (namely, a data link layer) header and a layer 3 header of the data packet in the target data flow. Subsequently, the extended header is referred to as a shim layer header, and a protocol corresponding to the shim layer header is referred to as a shim layer protocol. In this embodiment of this application, the data packet in the target data flow is usually a network layer data packet, for example, an IP data packet. Correspondingly, a network layer header of the data packet is an IP packet header of the data packet, and a data link layer header of the data packet is a media access control (MAC) header for encapsulation outside the data packet.

Figures 4A, 4B:
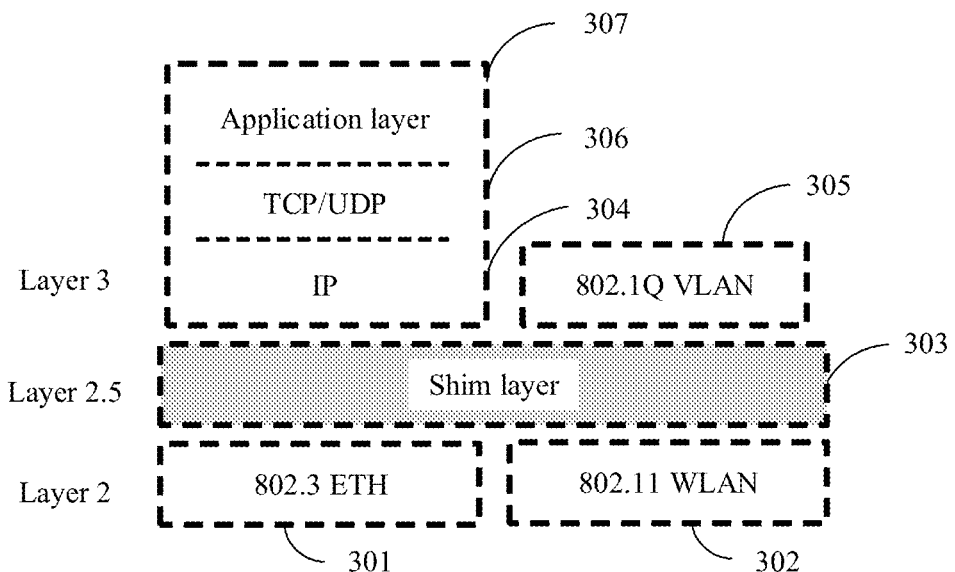
FIG. 4A and FIG. 4B are schematic structural diagrams of a protocol according to an embodiment of this application.

FIG. 4A is a schematic diagram of a network hierarchy in which a shim layer is added. As shown in FIG. 4A, a shim layer is extended between layer 2 and layer 3, and the extended shim layer is located between layer 2 and layer 3, and may also be referred to as layer 2.5. Each data packet that is in the target data flow and that is sent in a load balancing manner carries a shim layer header. For example, the data packet in the target data flow is an IP data packet, and the first device encapsulates a shim layer header of the IP data packet, and includes information such as a master sequence number in a shim layer header of the IP data packet. Correspondingly, the second device removes the shim layer header from the IP data packet before forwarding the IP data packet or receiving the IP data packet in the operating system protocol stack.

As shown in FIG. 4A, 301 is the 802.3 ethernet (ETH) protocol, 302 is the 802.11 WLAN protocol, and both belong to physical layer protocols and layer 2 protocols; 304 is the IP, 305 is the 802.1Q VLAN protocol, and both belong to layer 3 protocols; 306 is the transmission control protocol (TCP)/user datagram protocol (UDP), 307 is the application layer protocol, and both are protocols above layer 3. 303 is the shim layer protocol extended in this embodiment of this application.

A data structure of the extended shim layer header is shown in FIG. 4B.

Fields in the shim layer header are defined in Table 1.

TABLE 1

| Field | Usage |
| --- | --- |
| Version | Protocol version number |
| PHY ID | Physical link identifier |
| PT | Used to indicate a control message or a data packet that is sent in the multi-sending and selective receiving manner. |
| Status | Flow status |
| TYPE | Upper-layer protocol type, for example, 0X0800 indicates that an upper-layer protocol is the IP. |
| Sequence Number | Sequence number |
| Options (Flow ID) | Options, used to identify the target data flow. A default value is a flow ID. |

In an embodiment of this application, there may be two types of packets to which a shim layer header is added. One type is a control message, and the other type is a data packet sent in the multi-sending and selective receiving manner.

The control message is used to control a process of sending the target data flow in the multi-sending and selective receiving manner, and may be specifically the foregoing start notification, end notification, acknowledgment message, or the like. A shim layer header in the control message is used to carry related information of the target data flow. The shim layer header of the start notification includes information such as the initial sequence number and the flow identifier. A shim layer header of the end notification and a shim layer header of the acknowledgment message include information such as the flow identifier. When a value of the PT field indicates that a corresponding packet is a control message, a value of the sequence number field is the initial sequence number. When the value of the PT field indicates that a corresponding packet is a data packet sent in the multi-sending and selective receiving manner, a value of the sequence number field is a sequence number of the data packet.

The PT field may be used to specifically distinguish between packet types. A marker bit of the PT (Packet Type) is defined in Table 2.

TABLE 2

| Bit | Usage |
| --- | --- |
| Bit 0 | 0: There is no options field. 1: The options field is supported. |
| Bits 1 to 3 | 0x0: Data packet that is in the target data flow and that is sent in a multi-link mode<br>0x1 Start notification<br>0x2: End notification<br>0x3: Acknowledgment message |

A value of the bit 0 of the PT field indicates whether a packet in which the PT field is located includes the options field. 0 indicates that the packet includes the options field, and 1 indicates that the packet does not include the options field. Values of the bits 1 to 3 of the PT field are used to indicate a type of the packet in which the PT field is located. 0x0 indicates that the packet in which the PT field is located is a data packet that is in the target data flow and that is sent in the multi-link mode (for example, in the load balancing manner or in the multi-sending and selective receiving manner). 0x1 to 0x3 indicate that the packet in which the PT field is located is a control message, where 0x1 indicates that the packet in which the PT field is located is a start notification, 0x2 indicates that the packet in which the PT field is located is an end notification, and 0x3 indicates that the packet in which the PT field is located is an acknowledgment message. It should be noted that the control message may be signaling, or may be implemented by using a data packet that is not sent in the multi-link mode, provided that the data packet carries a field value used to indicate that the data packet is used as a control message.

A marker bit of the flow status field is defined in Table 3.

TABLE 3

| Bit | Usage |
| --- | --- |
| Bit0 | 0: Single-link status 1: Multi-link status |
| Bits 1 to 3 | 0x1: Multi-sending and selective receiving manner<br>0x2: Load balancing manner |

A value of the bit 0 of the status field indicates whether a data flow in which the status field is located is currently sent through a single physical link or a plurality of physical links, and values of the bits 1 to 3 of the status field are used to indicate whether a data transmission manner used for the data flow in which the status field is located is the multi-sending and selective receiving manner or the load balancing manner. 0x1 indicates multi-sending and selective receiving, and 0x2 indicates load balancing. The load balancing manner means that to-be-sent data packets in the target data flow are sent by using the plurality of physical links, and the second device combines, into the target data flow, different data packets in the target data flow that are received through different physical links.

According to the method 100 provided in Embodiment 1 of this application, because the data packets in the target data flow are sent through different physical links, not through only one physical link, when a transmission latency of the data packets is increased due to a bandwidth instability factor such as burst traffic or electromagnetic wave interference on any physical link, the second device combine, into a target video flow, data packets that are sent through other physical links and that have a lower latency, thereby effectively lowering a data transmission latency.

Figure 5:
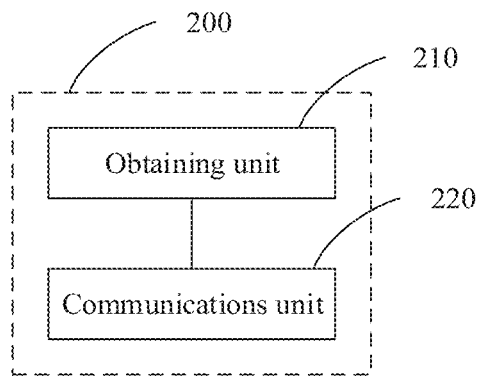
FIG. 5 is a schematic structural diagram of a communications device 200 according to Embodiment 2 of this application.

According to Embodiment 1 of this application, Embodiment 2 of this application provides a communications device 200. As shown in FIG. 5, the communications device 200 includes an obtaining unit 210 and a communications unit 220.

The obtaining unit 210 is configured to obtain data packets in a target data flow, where each of the data packets has a sequence number. The obtaining unit 210 is specifically configured to obtain the data packets in the target data flow from to-be-sent data packets. For example, the obtaining unit 210 identifies, as the data packets in the target data flow, data packets that are sent to a second device and that meet a preset condition (for example, data packets that belong to one or more preset services). For specific operations that can be performed by the obtaining unit 210, refer to a detailed processing process of a corresponding operation performed on a first device side in the foregoing embodiments shown in FIG. 2 to FIG. 4B, for example, a detailed processing process in operation S150. Details are not described herein again.

The communications unit 220 is configured to communicate with another communications device, including: sending the data packets through each of at least two physical links between the communications device and a receiving device, where the data packets sent through the at least two physical links have same sequence numbers. The communications unit 220 may be further configured to receive and send a control message (for example, send a start notification), establish a physical link between the communications device and the second device, and add information related to multi-sending and selective receiving, such as a sequence number and a flow identifier to the to-be-sent data packet in the target data flow. For specific operations that can be performed by the communications unit 220, refer to a detailed processing process of a corresponding operation performed on the first device side in the foregoing embodiments shown in FIG. 2 to FIG. 4B, for example, detailed processing processes in operations S110, S120, S140, and S150. Details are not described herein again.

Figure 6:
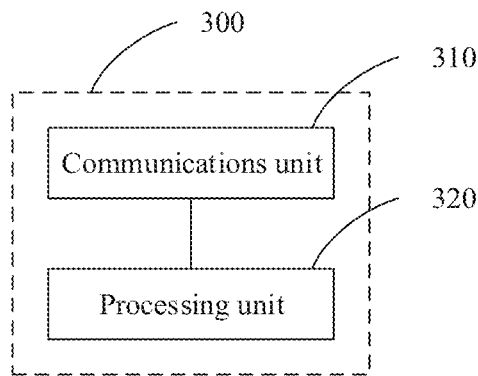
FIG. 6 is a schematic structural diagram of a communications device 300 according to Embodiment 3 of this application.

According to Embodiment 1 of this application, Embodiment 3 of this application provides a communications device 300. As shown in FIG. 6, the communications device 300 includes a communications unit 310 and a processing unit 320.

The communications unit 310 is configured to communicate with another communications device, including: receiving data packets in a target data flow through each of at least two physical links between the communications device and a sending device, where each data packet in the target data flow received through each of the at least two physical links carries a sequence number. The communications unit 310 may be further configured to: receive and send a control message (for example, receive a start notification), establish a physical link between the communications device and a first device, and so on. For specific operations that can be performed by the communications unit 310, refer to a detailed processing process of a corresponding operation performed on a second device side in the foregoing embodiments shown in FIG. 2 to FIG. 4B, for example, detailed processing processes in operations S110, S120, S140, S201 and S205. Details are not described herein again.

The processing unit 320 is configured to: for the data packets that are sent by the sending device through each of the at least two physical links and that have same sequence numbers in the target data flow, combine, into the target data flow, data packets that are first received and that carry the sequence numbers. For each data packet used to obtain through combination the target data flow, the data packet is forwarded by using the communications unit 310. For specific operations that can be performed by the processing unit 320, refer to a detailed processing process of a corresponding operation performed on the second device side in the foregoing embodiments shown in FIG. 2 to FIG. 4B, for example, detailed processing processes in operations S130, S160, S202 to S204, and S206 and S207. Details are not described herein again.

Figure 7:
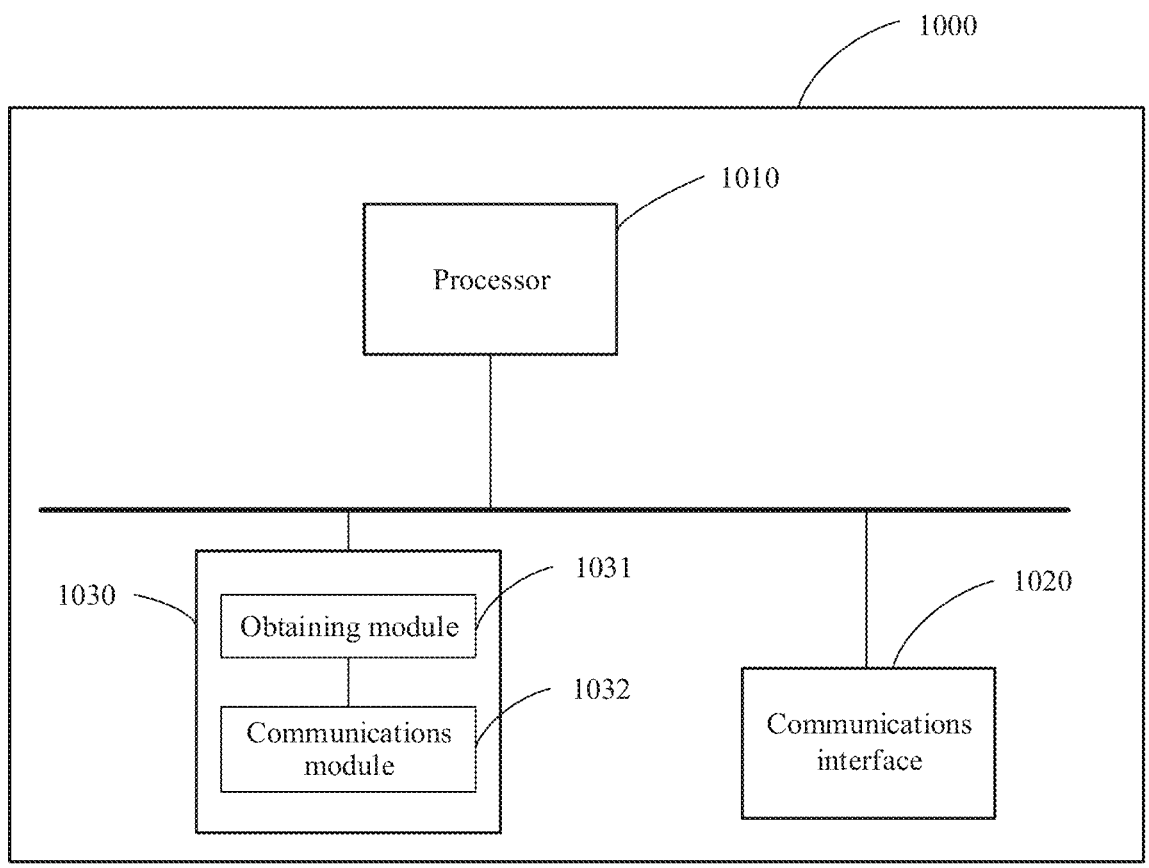
FIG. 7 is a schematic structural diagram of a communications device 1000 according to Embodiment 4 of this application.

According to Embodiment 1 of this application, Embodiment 4 of this application provides a communications device 1000. As shown in FIG. 7, the communications device 1000 includes a processor 1010 and a plurality of communications interfaces 1020.

The processor 1010 is configured to implement an operation performed by the first device in the method 100 provided in Embodiment 1 of this application. The processor 1010 communicates with another device through the communications interface 1020 when communicating with the another device. The processor 1010 may be specifically a central processing unit (CPU), or an application-specific integrated circuit (ASIC), or one or more integrated circuits configured to implement the embodiments of this application.

As shown in FIG. 7, the communications device 1000 may further include a memory 1030. The processor 1010 and the memory 1030 may implement mutual communication through a bus. The memory 1030 is configured to store a computer operation instruction, and may be specifically a high-speed random access memory (RAM), or may be a non-volatile memory. The processor 1010 may specifically execute the computer operation instruction stored in the memory 1030. The computer operation instruction is executed, so that the communications device 1000 performs the operations performed by the first device in the method described in Embodiment 1. During specific implementation, the memory 1030 may include an obtaining module 1031 and a communications module 1032 that implement the obtaining unit 210 and the communications unit 220 shown in FIG. 5 respectively. Correspondingly, the processor 1010 specifically executes the instruction in the obtaining module 1031, to implement a function of the obtaining unit 210, and executes an instruction in the communications module 1032, to implement a function of the communications unit 220. For specific operations that can be performed by each unit in the communications device 1000, refer to a detailed processing process of a corresponding operation performed on a first device side in the foregoing embodiments shown in FIG. 2 to FIG. 4B. Details are not described herein again.

Figure 8:
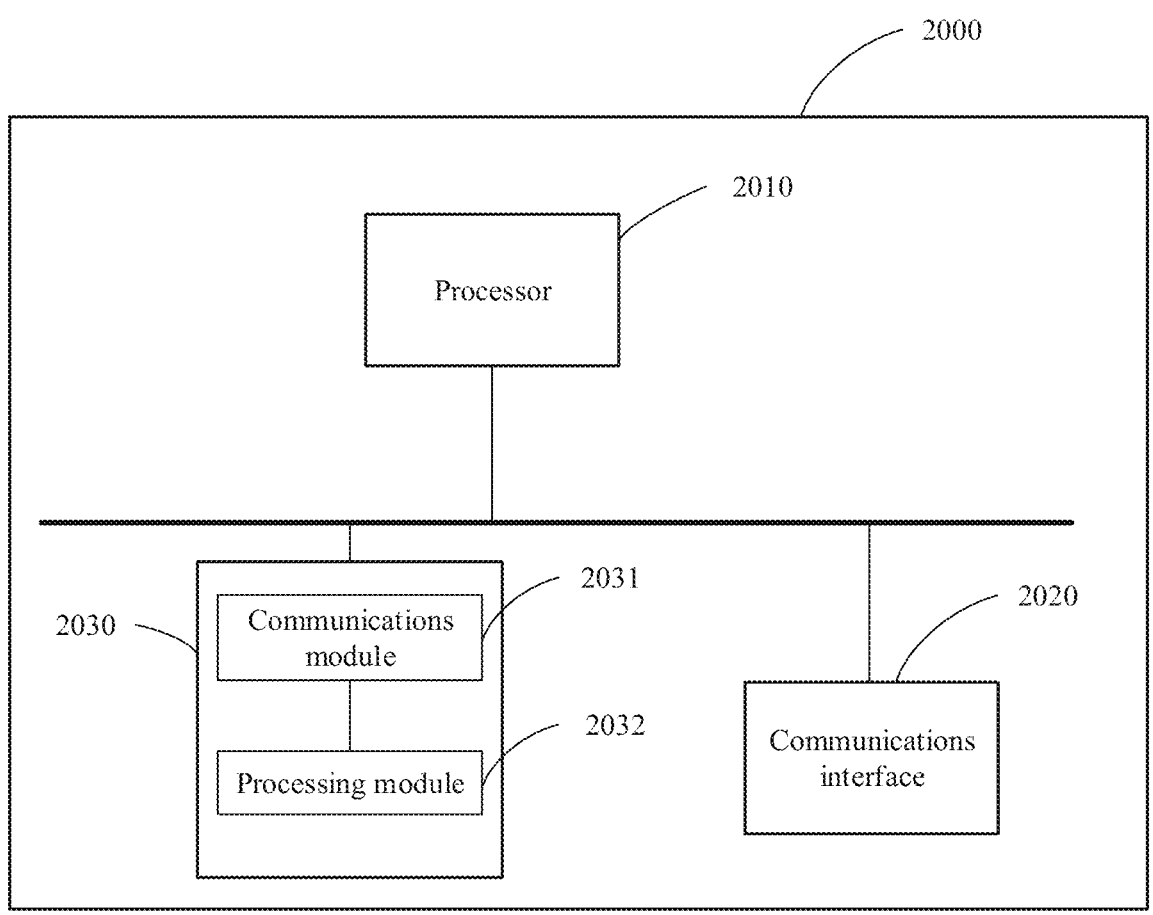
FIG. 8 is a schematic structural diagram of a communications device 2000 according to Embodiment 5 of this application.

According to Embodiment 1 of this application, Embodiment 5 of this application provides a communications device 2000. As shown in FIG. 8, the communications device 2000 includes a processor 2010 and a plurality of communications interfaces 2020.

The processor 2010 is configured to implement an operation performed by the second device in the method 100 provided in Embodiment 1 of this application. The processor 2010 communicates with another device through the communications interface 2020 when communicating with the another device. The processor 2010 may be specifically a CPU, or an ASIC, or one or more integrated circuits configured to implement the embodiments of this application.

As shown in FIG. 8, the communications device 2000 may further include a memory 2030. The processor 2010 and the memory 2030 may implement mutual communication through a bus. The memory 2030 is configured to store a computer operation instruction, and may be specifically a RAM, or may be a non-volatile memory. The processor 2010 may specifically execute the computer operation instruction stored in the memory 2030. The computer operation instruction is executed, so that the communications device 2000 performs the operations performed by the second device in the method described in Embodiment 1. During specific implementation, the memory 2030 may include a communications module 2031 and a processing module 2032 that implement the obtaining unit 310 and the communications unit 320 shown in FIG. 6 respectively. Correspondingly, the processor 2010 specifically executes an instruction in the communications module 2031, to implement a function of the communications unit 310, and executes an instruction in the processing module 2032, to implement a function of the communications unit 310. For specific operations that can be performed by each unit in the communications device 1000, refer to a detailed processing process of a corresponding operation performed on a second device side in the foregoing embodiments shown in FIG. 2 to FIG. 4B. Details are not described herein again.

All or some of the foregoing embodiments may be implemented by using software, hardware, firmware, or any combination thereof. When the embodiments are implemented by using software, all or some of the embodiments may be implemented in a form of a computer program product. The computer program product includes one or more computer instructions. When the computer program instructions are loaded and executed on the computer, all or some of the procedures or the functions according to the embodiments of this application are generated. The computer may be a general-purpose computer, a dedicated computer, a computer network, or another programmable apparatus. The computer instructions may be stored in a computer-readable storage medium, or may be transmitted from one computer-readable storage medium to another computer-readable storage medium. The computer-readable storage medium may be any usable medium accessible to the computer. The usable medium may be a magnetic medium (for example, a floppy disk, a hard disk, or a magnetic tape), an optical medium (for example, a DVD), a semiconductor medium (for example, a solid-state drive (SSD)), or the like.

What is claimed is:

1. A method for implementing data transmission, wherein the method comprises:
obtaining, by a sending device, a data packet in a target data flow; and
sending, by the sending device, the data packet through each of at least two physical links between the sending device and a receiving device, wherein the data packet sent through each of the at least two physical links comprises a same sequence number, wherein the sequence number of the data packet is carried in an extended shim layer header of the data packet between a data link layer header and a network layer header and the extended shim layer header corresponds to a shim layer protocol.

2. The method according to claim 1, wherein before the sending, by the sending device, the data packet through each of at least two physical links between the sending device and a receiving device, the method further comprises: adding, by the sending device, the sequence number to the data packet.

3. The method according to claim 1, wherein the data packet further carries a flow identifier of the target data flow.

4. The method according to claim 1, wherein the target data flow comprises one or more data flows of a preset service.

5. The method according to claim 1, wherein a 5-tuple of the target data flow is a preset 5-tuple.

6. A communications device, wherein the communications device comprises:
a non-transitory memory storing instructions; and
a processor coupled to the non-transitory memory; wherein the instructions, when executed by the processor, cause the communications device to be configured to:
obtain a data packet in a target data flow; and
send the data packet through each of at least two physical links between the communications device and a receiving device, wherein the data packet sent through each of the at least two physical links comprises a same sequence number, wherein the sequence number of the data packet is carried in an extended shim layer header of the data packet between a data link layer header and a network layer header and the extended shim layer header corresponds to a shim layer protocol.

7. The communications device according to claim 6, wherein the instructions, when executed by the processor, further cause the communications device to be configured to add the sequence number to the data packet.

8. The communications device according to claim 6, wherein the data packet further comprises a flow identifier of the target data flow.

9. The communications device according to claim 6, wherein the target data flow comprises one or more data flows of a preset service.

10. The communications device according to claim 6, wherein a 5-tuple of the target data flow is a preset 5-tuple.

11. A communications device, wherein the communications device comprises:
a non-transitory memory storing instructions; and
a processor coupled to the non-transitory memory; wherein the instructions, when executed by the processor, cause the communications device to be configured to:
receive data packets in a target data flow through each of at least two physical links between the communications device and a sending device, wherein each data packet in the target data flow received through each of the at least two physical links carries a sequence number; and
for a data packet that is sent by the sending device through each of the at least two physical links and that comprises a same sequence number in the target data flow, combine, into the target data flow, the data packet that is first received and that carries the sequence number, wherein the sequence number of each data packet in the target data flow is carried in an extended shim layer header of the data packet between a data link layer header and a network layer header and the extended shim layer header corresponds to a shim layer protocol.

12. The communications device according to claim 11, wherein the instructions, when executed by the processor, further cause the communications device to be configured to: for the data packet that is sent by the sending device through each of the at least two physical links and that comprises the same sequence number in the target data flow, discard the data packet that is received later and that carries the sequence number.

13. The communications device according to claim 11, wherein each data packet in the target data flow that is sent by the sending device through each of the at least two physical links further comprises a flow identifier of the target data flow; and the instructions, when executed by the processor, further cause the communications device to be configured to identify a data packet that carries the flow identifier of the target data flow in the received data packets, as the data packet in the target data flow.

14. The method according to claim 1, wherein the data packet further comprises a control message used to control a process of sending the target data flow and the control message is one of: start notification, end notification, or acknowledgment message.

15. The method according to claim 1, wherein the data packet further comprises a flow status, wherein the flow status indicates single-link or multi-link, wherein multi-link comprises indications for multi-sending and selective receiving manner, or load balancing manner.

16. The method according to claim 1, further comprising:
obtaining, by the sending device, data packets of an other preset service;
determining that the other preset service corresponds to a load balancing manner; and
sending, by the sending device, the data packets corresponding to the other preset service through each of at least two physical links between the sending device and the receiving device, wherein the data packets sent through each of the at least two physical links comprise different sequence numbers.

* * * * *